United States Patent

Bahat et al.

[11] Patent Number: 6,076,549
[45] Date of Patent: Jun. 20, 2000

[54] PRESSURE CONTROL DEVICE

[75] Inventors: Amit Bahat, Kiryat-Yam; Dan Budescu, Haifa, both of Israel

[73] Assignee: State of Israel Ministry of Defense Armaments Development Authority, Rafael, Haifa, Israel

[21] Appl. No.: 09/165,406

[22] Filed: Oct. 2, 1998

Related U.S. Application Data

[63] Continuation of application No. 08/716,089, Sep. 19, 1996, abandoned.

[30] Foreign Application Priority Data

Sep. 21, 1995 [IL] Israel .......................................... 115378

[51] Int. Cl.[7] ..................................................... F16K 31/12
[52] U.S. Cl. ................ 137/505.14; 137/505; 137/505.18
[58] Field of Search ............................... 137/906, 505.14, 137/505.18, 505

[56] References Cited

U.S. PATENT DOCUMENTS

| | | | |
|---|---|---|---|
| 1,301,405 | 4/1919 | Dexter | 137/505.14 |
| 2,163,597 | 6/1939 | Grove | 137/906 |
| 2,984,225 | 5/1961 | Young . | |
| 3,006,362 | 10/1961 | Spence | 137/505.14 |
| 3,335,242 | 8/1967 | Johnson . | |
| 3,825,029 | 7/1974 | Genbauffe | 137/505 |
| 3,911,947 | 10/1975 | Boxall | 137/505.14 |
| 4,573,398 | 3/1986 | Johnson et al. . | |
| 5,218,991 | 6/1993 | Gray | 137/505.14 |

*Primary Examiner*—Denise L. Ferensic
*Assistant Examiner*—Joanne Y. Kim
*Attorney, Agent, or Firm*—Merchant & Gould P.C.

[57] ABSTRACT

Pressure control device, characterized in that it comprises, in combination with valve means having an open and a closed position and urged to said closed position by a pressure thrust, elastic means opposing the closure of said valve means by exerting thereon an elastic counterthrust opposed to said pressure thrust, said means being normally in a condition of normal strain or stress wherein it creates a first level of elastic counterthrust such as to be overcome by said pressure thrust when it exceeds a first predetermined level; and means for bringing said elastic means to at least another condition of strain or stress, wherein it creates a second level of elastic counterthrust such as to be overcome by said pressure thrust when it exceeds a second predetermined level.

23 Claims, 3 Drawing Sheets

PRESSURE CONTROL DEVICE

This application is a continuation of Ser. No. 08/716,089, filed Sep. 19, 1996, abandoned.

FIELD OF THE INVENTION

This invention refers to pressure control devices, more particularly to dual pressure level control devices which selectively and controllably attribute to the pressure in a controlled apparatus one of at least two predetermined levels.

BACKGROUND OF THE INVENTION

Many industrial operations require that the pressure in an apparatus should have different values during different operations or operation phases. In many cases, the working cycle of an apparatus, e.g., a press or other apparatus comprising a cylinder and piston or like devices, comprises different phases, one or more of which are active or work phases, while one or more of which are passive or non-work phases. Thus, a piston of a press may have an operating cycle including an active or work stroke and an inactive or return stroke, and different pressures should be obtained in the cylinder, for optimal operation, in the two different strokes. The use of a lower pressure during the non-work phase of the apparatus cycle results, in many cases, in a considerable cost saving. In particular, gas and/or energy consumption may be reduced. In other cases, different operations may require different pressures for optimal efficiency. For instance, an apparatus might require a relatively high pressure to start its operation and then a lower one to maintain the operation over a period of time.

Dual level pressure regulation is effected in the art by providing a separate pressure source or pressure regulator for each desired pressure level. A suitable switch may activate one or the other of said pressure regulators according to the phase of the operating cycle that is taking place.

It is a purpose of this invention to provide a pressure control device which can determine two pressure levels, without requiring two pressure sources or regulators, and permits to control said levels in any desired, even continuous, manner.

It is another purpose of this invention to provide such a pressure control device that is simple, space-saving and free from the danger of malfunctions.

It is a further purpose of this invention to provide a dual pressure level control device that normally determines the higher or the lower of the two pressure levels and correspondingly shifts, when actuated, to the lower or higher level, depending on the chosen embodiment of the invention.

It is a still further purpose of this invention to provide a pressure controlled apparatus, comprising, in combination, a working apparatus of any kind, the operation of which requires the creation and control of a pressure, and a pressure control device according to the invention for carrying out the required pressure control.

Other purposes and advantages of the invention will appear as the description proceeds.

SUMMARY OF THE INVENTION

The pressure control apparatus according to the invention comprises, in combination with a space or chamber in a working apparatus, in which more than one level of a pressure—hereinafter designated as "regulated" or "controlled" pressure"—is to be maintained, with a "source" (or "primary") pressure, with conduit means placing said regulated pressure in communication with said working apparatus space, and with valve means having an open position in which said space is open to said conduit means and a closed position in which said space is sealed off from said conduit means, said regulated pressure in said space creating a pressure thrust on said valve means urging the same to its closed position, pressure level control means comprising elastic means opposing the closure of said valve means by exerting thereon an elastic counterthrust opposed to said pressure thrust, said means being normally in a condition of normal strain or stress wherein it creates a first level of elastic counterthrust such as to be overcome by said pressure thrust when said regulated pressure exceeds a first predetermined level; and means for bringing said elastic means to at least another condition of strain or stress, wherein it creates a second level of elastic counterthrust such as to be overcome by said pressure thrust when said regulated pressure exceeds a second predetermined level.

The pressure control device according to the invention is characterized in that it comprises—in combination with valve means having an open and a closed position and urged to said closed position by a pressure thrust—elastic means opposing the closure of said valve means by exerting thereon an elastic counterthrust opposed to said pressure thrust, said means being normally in a condition of normal strain or stress wherein it creates a first level of elastic counterthrust such as to be overcome by said pressure thrust when it exceeds a first predetermined level; and means for bringing said elastic means to at least another condition of strain or stress, wherein it creates a second level of elastic counterthrust such as to be overcome by said pressure thrust when it exceeds a second predetermined level.

The aforesaid working apparatus, comprising the space in which the regulated pressure is obtained, the source pressure, and the conduit and valve means, are not a part of the invention and may be of any kind, comprising conventional kinds known in the art or other that may be devised by persons skilled in the art.

Preferably, said elastic means of said pressure controlled apparatus or of said pressure control device is a spring, and more preferably, a compression spring. In an embodiment of the invention, the two conditions of strain are two degrees of deformation, preferably of compression, of the spring. More preferably, said degree of deformation is determined by the distance between two portions of the spring and the different conditions of strain are obtained by modifying said distance. Still more preferably, said distance is modified by causing the regulated pressure to exert a force only on one or on both said portions of the spring, to increase or decrease, as the case may be, the elastic counterthrust thereof.

In a particular preferred form of the invention, the spring is a helical one, or has a structure equivalent to a helical structure for the purposes of its elastic behavior, by which is meant that is exerts, when compressed or stretched, an elastic force directed along an axis which is essentially coaxial with the thrust exerted by the regulated pressure on the aforesaid valve means (hereinafter "longitudinal axis") and the different conditions of strain are obtained by applying to said elastic means a control force parallel to said longitudinal axis, e.g., if said elastic means are a spring, on at least one end of the spring. Said control force is produced by applying a pressure, preferably the regulated or controlled pressure, to a force transmitting element. Said element is preferably a member guided for displacement parallel and opposed to said thrust exerted on said valve means, such as a plunger or piston or the like.

In a preferred embodiment of the device, the elastic means and parts cooperating with it are enclosed in a staggered, cylindrical or sleeve-like casing, which is rigidly connected to the valve means housing and coaxial with the valve and houses the aforesaid spring and piston. By "staggered, cylindrical casing" is meant a casing that comprises one or more essentially cylindrical portions solid with or rigidly connected with one another.

The means for bringing said elastic means from their normal strained or stressed condition to their other strained condition preferably include a selection valve, e.g. a solenoid valve, for selectively admitting the regulated or controlled pressure to a chamber, within the pressure control device, wherein it creates a force that is transmitted to the elastic means. In a preferred embodiment of the invention, said selection valve selectively places said chamber in communication with a space in which said regulated pressure exists, or with the atmosphere. The operation of the selection valve may preferably be controlled automatically by programmable control means, e.g. computer means.

DETAILED DESCRIPTION OF PREFERRED EMBODIMENTS

Figure 1:
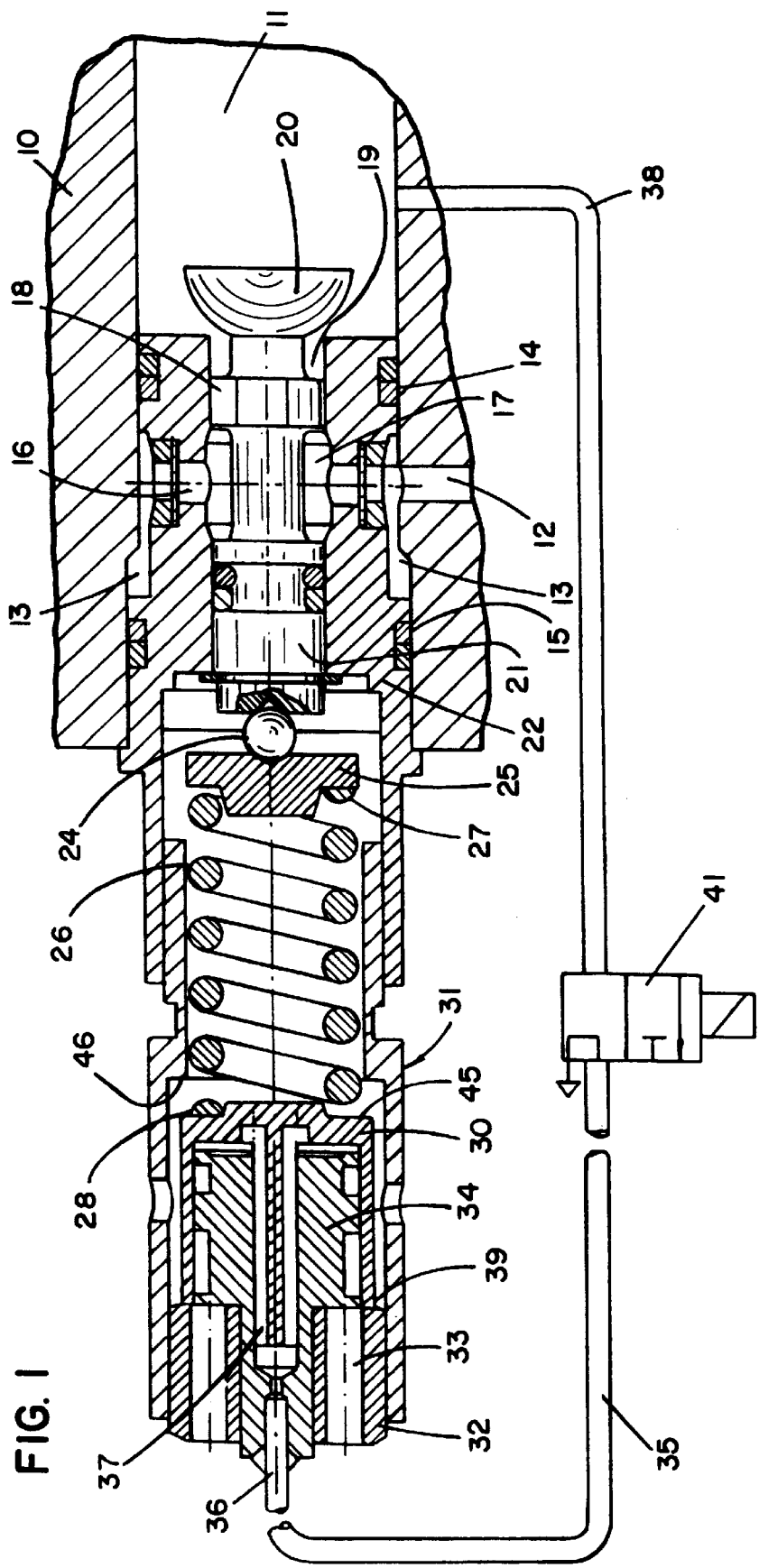
FIG. 1 is an axial cross-section of a device according to an embodiment of the invention.

With reference now to FIG. 1, numeral 10 generally designates a casing (shown as broken off) which encloses a chamber 11 that is part of or communicates with the working apparatus space in which pressure control is desired. Source pressure is introduced through any suitable inlet conduit, only schematically indicated at 12, into annular space 13 (gaskets 14 and 15 being provided to prevent escape of pressure) therefrom through ports one of which—port 16—is shown in the drawing, into annular space 17, and ,through a number (in this embodiment three) of circumferentially located passageways, one of which is shown in the drawing at 18 and annular inlet 19 between the valve seat and the valve stem, into chamber 11. The same pneumatic conditions exist, of course, in elements 12, 13, 16, 17 and 18. Valve plunger 20, when closed, seals off the annular passage or inlet 19, through which pressure is admitted into the chamber 11. Said annular inlet is the dividing line between the source pressure and the regulated pressure spaces. The conduit and valve arrangement hereinbefore described is not part of the invention and may be of any suitable type, one particular type thereof being shown only for purposes of illustration.

Plunger 20 is connected to plunger stem 21, which is housed and guided in essentially tubular valve casing 22, mounted in casing 10.

Plunger stem 21 bears, preferably through the interposition of a ball 24, on a disk or cap 25, against which bears the uppermost end 27, hereinafter called the inner end, of a spring 26. The other end of the spring, hereinafter called the outer end, 28, bears against a retaining element hereinafter called dynamic cylinder 30. All the aforesaid elements are retained within a sleeve generally indicated at 31, which is mounted and retained in casing 22 e.g. by being screwed into it. Sleeve 31 is closed at its outer end by a nut 32, screwed into it and provided with bores 33 for tightening it. Said nut 32 retains a core 34. A conduit 38 communicates with chamber 11, as schematically indicated in the drawing, or with any portion of the apparatus in which the regulated pressure exists. Conduit 38, in turn, leads to a valve, e.g. a solenoid valve 41, which is only schematically indicated in the drawing because it is, in itself, a device well known in the art, which communicates through a conduit 35 and a gas inlet 36, with a space 37 defined in said core 34, and may selectively connect said space 37, as schematically indicated in the drawing, with conduit 38, and therefore with chamber 11, or with the atmosphere. When the solenoid valve is actuated to connect conduit 35 with conduit 38, regulated or controlled pressure is admitted to space 37 and bears on the underside of dynamic cylinder 30.

Figure 2:
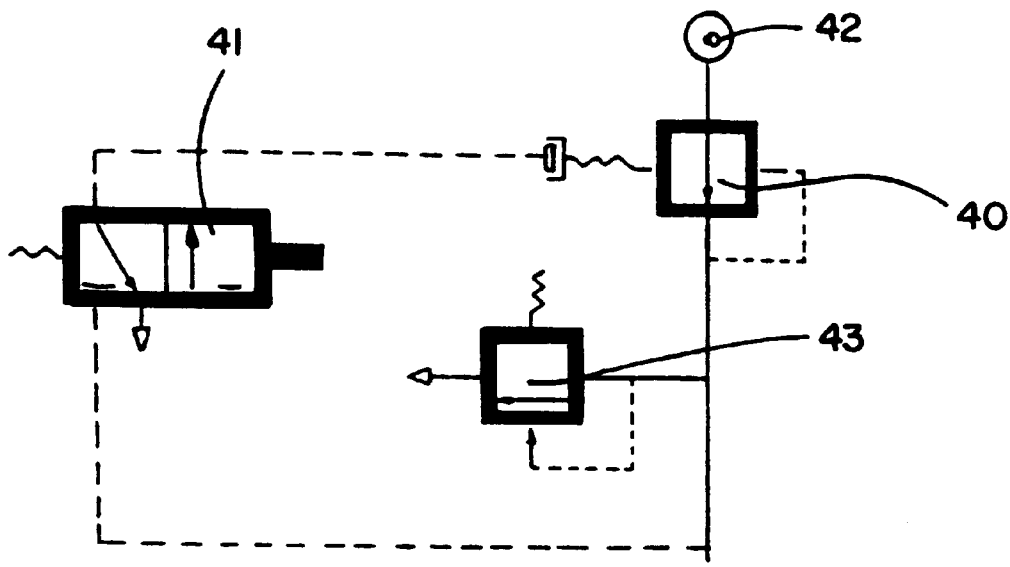
FIG. 2 is a block diagram illustrating an embodiment of the apparatus with which the device of FIG. 1 cooperates.

The pressure control apparatus, of which the device of FIG. 1 is the essential component, is diagrammatically illustrated in FIG. 2. Therein the pressure control device of FIG. 1 is generally indicated at 40. Solenoid valve 41, controls the admission of regulated pressure to the device of FIG. 1 or vents the device to the atmosphere. 42 is a supply of source pressure. It will be understood that the source pressure need not be constant. If source 42 is a pressure vessel that contains a given amount of gas, the source pressure will gradually decrease as more of such gas is fed to the working apparatus. Any overpressure in the system is directly released to the atmosphere from relief valve 43.

The operation of the device is as follows.

The regulated pressure in regulated pressure chamber 11 may have two levels, according to the particular operations or process or cycle phases which take place in the particular working apparatus. A primary pressure source feeds gas under pressure through inlet 12 and ports 16, annular space 17, passageway 18 and annular inlet 19, to chamber 11. The admission of gas under pressure ceases when plunger 20 seals off inlet 19. Plunger 20 will seal off inlet 19 when the pressure in chamber 11 has reached such a value that it creates a pressure thrust on plunger 20 that overcomes the elastic counterthrust of spring 26. The thrust on plunger 20 is proportional to the pressure in chamber 11. The elastic counterthrust of spring 26 depends on its condition of strain, specifically, in this particular type of spring, on the distance between the two ends 27 and 28 of the spring itself When plunger 20 is in its open position, the disk or cover 25 and therefore upper end 27 of spring 26 is in its innermost position—its rightmost position as seen in the drawing—and cannot become displaced from that position unless plunger 20 starts to close. If no pressure is admitted through conduit 35 to space 37 below dynamic cylinder 30, this latter is in its outermost position—its leftmost position, as shown in FIG. 1—wherein it bears with its outermost lip 39 against nut 32. Spring 26 is therefore as distended as it can be, and its strain and its elastic counterthrust are at their minimum values. When solenoid 41 is actuated to place conduit 35 in communication with chamber 11, regulated pressure is admitted through conduits 38 and 35 and inlet 36 to space 37, and this causes dynamic cylinder 30 to lift inwards (rightwards, in the drawing) compressing spring 26. Cylinder 30 can lift until the upper surface 45 bears against shoulder 46 of sleeve 31. Under those conditions, the strain of spring 26 and its elastic counterthrust will be higher and a corresponding higher pressure in chamber 11 will be required to cause plunger 20 to close inlet 19. When it is wished to restore the conditions of minimum strain and counterthrust of spring 26, solenoid valve 41 is deactivated to seal off conduit 35 from chamber 11 and place the conduit in communication with the atmosphere, whereby pressure is vented from space 37 and dynamic cylinder 30 returns to its initial or normal position, shown in FIG. 1, allowing spring 26 to become distended as far as is permitted by plunger's lips 39 bearing against nut 32.

Therefore, the pressure in chamber 11 will have two possible levels: a normal low level corresponding to the absence of pressure in the device below dynamic cylinder 30, and a high level corresponding to the admission of pressure to cause the dynamic cylinder 30 to become displaced inwardly and compress spring 26. In this way, by acting on solenoid 41 to admit regulated pressure to a space below the dynamic cylinder or to discharge said pressure therefrom, the regulated pressure in chamber 11 can be set at its high or low value, as desired. It will be appreciated that, instead of causing the regulated pressure to act on dynamic cylinder 30, another source of pressure could be used to act on said cylinder. However this would involve providing an additional source of pressure, and therefore it is less desirable to carry out the invention in this manner. The same consideration applies to any embodiment of the invention.

Figure 4:
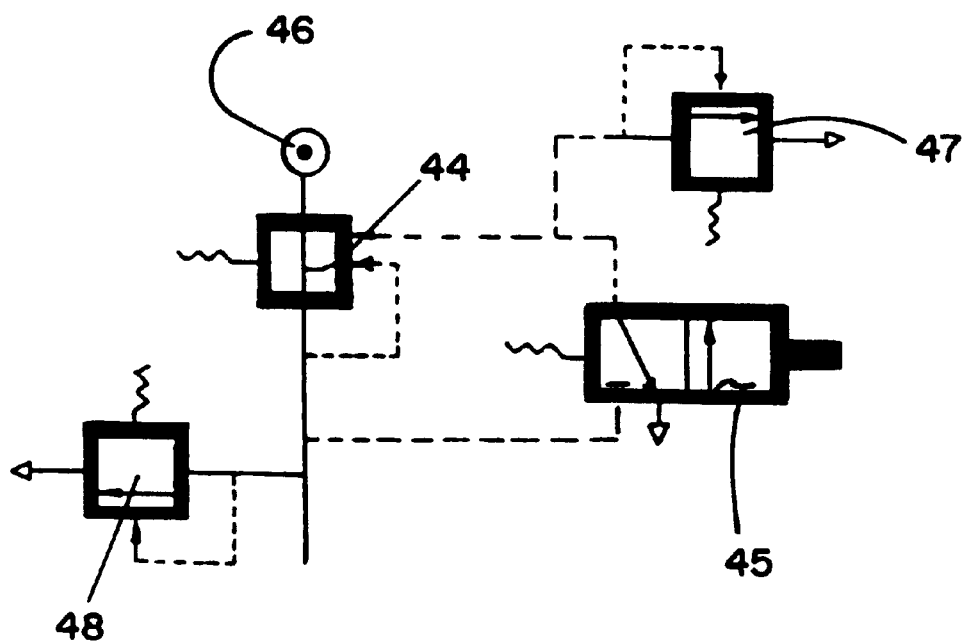
FIG. 4 is a block diagram illustrating an embodiment of the apparatus with which the device of FIG. 3 cooperates.
Figure 3:
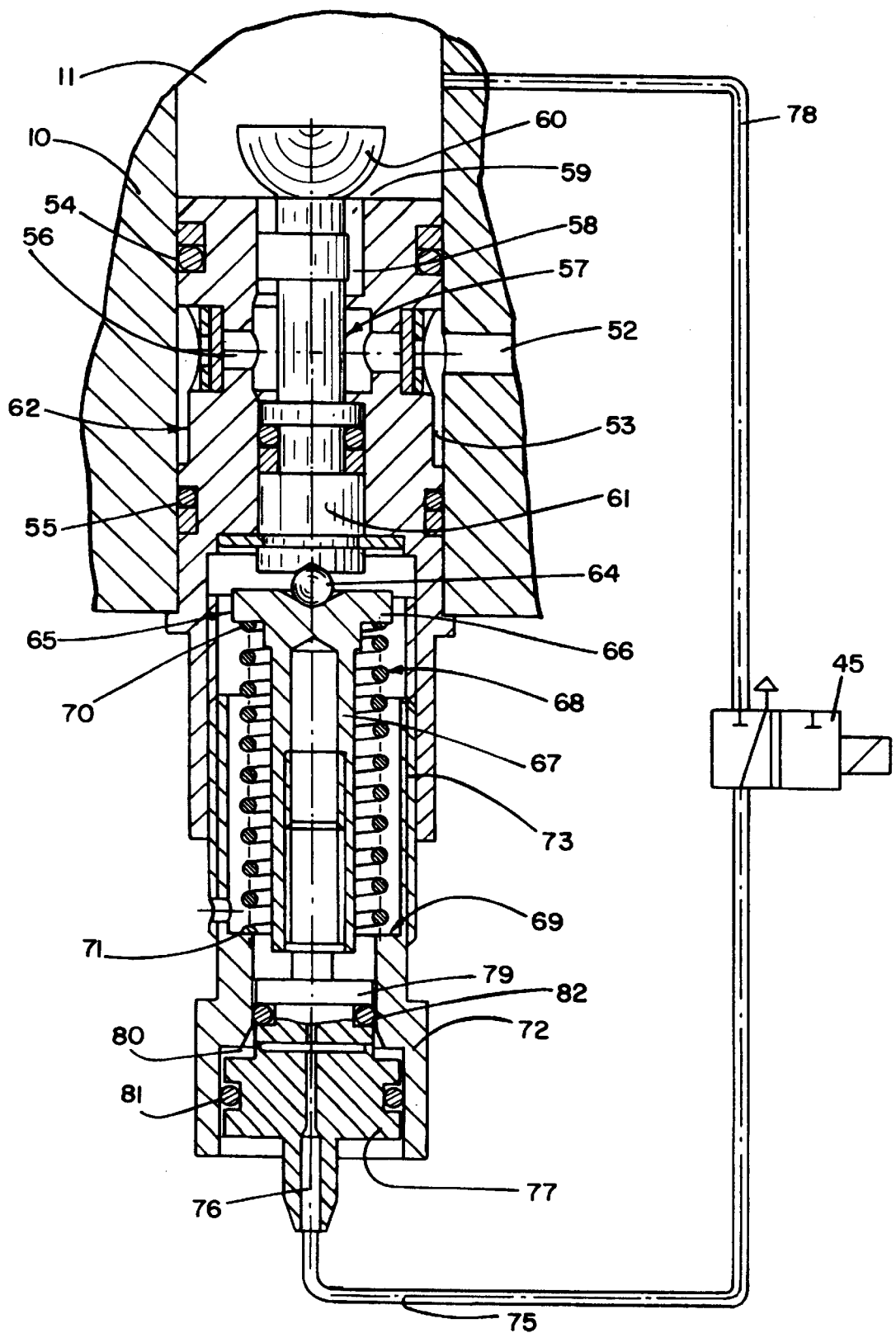
FIG. 3 is an axial cross-section of a device according to a second embodiment of the invention.

In the embodiment of FIGS. 3 and 4, the pressure control device also produces in chamber 11 two different regulated pressure values, but the device will cause the pressure to be normally at its higher value.

Once again, numeral 10 generally designates a casing (shown as broken off), which encloses a space 11 that is part of or communicates with the working apparatus in which pressure control is desired. Source pressure is introduced through any suitable inlet conduit, only schematically indicated at 52, into annular space 53 (gaskets 54 and 55 being provided to prevent escape of pressure) therefrom through ports one of which—port 56—is shown, into annular space 57, and, through passageways, one of which is shown in the drawing at 58, and annular inlet 59 between the valve seat and the plunger stem, into chamber 11. Valve plunger 60, when closed, seals off the annular inlet 59. The conduit and valve arrangement hereinbefore described is not part of the invention and may be of any suitable type, one particular type thereof being shown only for purposes of illustration. Plunger 60 is connected to plunger stem 61, which is housed and guided in essentially tubular valve casing 62, mounted in casing 10.

Up to now, there is no significant difference between this embodiment and the one illustrated in FIG. 1. In this embodiment, however, plunger stem 61 bears, preferably through the interposition of a ball 64, on a core 65, which has a staggered cylindrical shape and has a generally T-shaped axial cross-section, and has an upper, cap portion 66 and a lower, tubular portion 67, externally and concentrically of which is located spring 68. The end 70 of spring 68 bears against the underside of cap portion 66 of core 65. The other end 71 of the spring bears against a shoulder 69 of a generally tubular body or sleeve 72, screwed into casing 62, as shown at 73.

As in the first embodiment, regulated pressure may be selectively admitted to the device from chamber 11, or other part of the apparatus in which the regulated pressure exists, through conduit 78, solenoid valve 45 and conduit 75, through inlet conduit 76 which is a perforation of a plug 77. Plug 77, threadedly connected to core 65, is slidable in sleeve 72. A space 80 between plug 77 and sleeve 72 is sealed off by gaskets 81 and 82.

The operation of this embodiment is as follows.

Source pressure is admitted to the device and regulated pressure is built up in chamber 11 as in the embodiment of FIGS. 1 and 2. Regulated pressure normally exists in chamber 11 during the pressure phases of the operation of the working apparatus. When the pressure in the chamber 11 reaches the predetermined desired high level, the force exerted by said pressure on valve plunger 60 exceeds the elastic reaction of spring 68 and the plunger closes the annular space 59 and prevents further pressure increase in the chamber. When it is desired to lower the level of the pressure in chamber 11, regulated pressure is admitted through conduit 78, solenoid 45 and conduit 75, to space 80, where it exerts a pressure on plug 77. The force exerted on plug 77 urges plug 77 and core 65 downwards— "downwards" as seen in FIG. 3—viz. away from plunger stem 61 and chamber 11. This tends to compress spring 68 and therefore reduces its elastic reaction, so that a lower pressure in chamber 11 is required to cause plunger 60 to seal annular space 59 and prevent pressure increase in chamber 11. When it is desired to return to the higher regulated pressure condition, solenoid valve 45 is deactivated to place conduit 75 in communication with the atmosphere.

In the diagrammatic illustration of FIG. 4, analogous to FIG. 2, the pressure control device of FIG. 3 is generally indicated at 44 and the solenoid valve indicated at 45 controls the admission of gas under regulated pressure to the device of FIG. 3 as well as the discharge of said pressure to the atmosphere from the pressure control device of FIG. 3 through the conduit 75. However, while in the apparatus of FIG. 2 only one pressure relief valve is provided, this embodiment includes a high pressure relief valve 47 and a low pressure relief valve 48.

It will be clear to persons skilled in the art that the invention permits continuous pressure control by continuous variation of the control pressure. Thus in both configurations, e.g. of FIGS. 1 and 3, and their relative control schemes as in FIGS. 2 and 4 accordingly, the controlled pressure level can be varied by control means of the solenoid valve, e.g. a PWM (pulsed wave modulation) control. An example of implementation is a robot "gripper" with closed loop force or torque control.

While specific embodiments of the invention have been described by way of illustration, it will be understood that they are not limitative and that the invention may be carried into practice with many modifications, variations and adaptations, without departing from its spirit or exceeding the scope of the claims.

We claim:

1. Pressure control device for switching a pressure in an integral chamber between at least two distinct pressure levels, characterized in that it comprises, in combination with valve means having an open and a closed position and urged to said closed position by a pressure thrust, elastic means opposing the closure of said valve means by exerting thereon an elastic counter-thrust opposed to said pressure thrust, said means being normally in a condition of normal stress wherein it creates a first level of elastic counter-thrust such as to be overcome by said pressure thrust when it exceeds a first predetermined level; and means for bringing said elastic means to at least another condition of stress, wherein it creates a second level of elastic counter-thrust such as to be overcome by said pressure thrust when it exceeds a second predetermined level.

2. Pressure control device according to claim 1, wherein said elastic means is a spring.

3. Pressure control device according to claim 2, wherein said elastic means is a compression spring.

4. Pressure control device according to claim 2, wherein the two conditions of stress are two degrees of deformation of the spring.

5. Pressure control device according to claim 4, wherein the degrees of deformation are determined by the distance between two portions of the spring and the different conditions of stress are obtained by modifying said distance.

6. Pressure control device according to claim 4, wherein the distance between two portions of the spring is modified by causing the regulated pressure to exert force only on one of said portions of the spring, to increase or decrease the counterthrust thereof.

7. Pressure control device according to claim 2, wherein the spring exerts, when compressed or stretched, an elastic force directed along the longitudinal axis and the different conditions of stress are obtained by applying to said elastic means a control force, parallel to said longitudinal axis and essentially coaxial with the thrust exerted by the regulated pressure on the valve means.

8. Pressure control device according to claim 7, wherein the control force is produced by applying the regulated pressure to a force transmitting element.

9. Pressure control device according to claim 8, wherein the force transmitting element is a member guided for displacement parallel and opposed to the thrust exerted on the valve means.

10. Pressure control device according to claim 8, wherein the force transmitting element is a piston.

11. Pressure control device according to claim 8, wherein the force transmitting element is a cylindrical element.

12. Pressure control device according to claim 1, wherein the means for bringing the elastic means from their normal stressed condition to their other stressed condition include a control valve.

13. Pressure control device according to claim 12, wherein the control valve is a solenoid valve.

14. Pressure control device according to claim 12, wherein the control valve selectively places said chamber in communication with a space, in which the regulated pressure exists, or with the atmosphere.

15. Pressure control device according to claim 1, wherein the means for bringing the elastic means to at least another condition of stress comprise means for exerting a control pressure on a member which is in engagement with said elastic means.

16. Pressure control device according to claim 1, wherein the elastic means are enclosed in a casing, rigidly connected to the valve means housing and coaxial with the valve.

17. Pressure control device according to claim 1, wherein the elastic means is a compression spring, which control device comprises a thrust transmission element upon which the valve means exerts its pressure thrust and said spring exerts its counterthrust, and further comprises means for increasing the degree of stress of said spring by exerting on said thrust transmission element a pressure parallel to said spring counterthrust and in the same direction.

18. Pressure control device according to claim 17, wherein the control pressure is the regulated pressure.

19. Pressure control device according to claim 1, wherein the elastic means is a compression spring, which control device comprises a thrust transmission element upon which the valve means exerts its pressure thrust and said spring exerts its counterthrust, and further comprises means for decreasing the degree of stress of said spring by exerting on said thrust transmission element a pressure parallel to said spring counterthrust and in the opposite direction.

20. A pressure control device according to claim 1, wherein said valve means slidably mounts in the pressure control device, and wherein the means for bringing said elastic means to at least another condition of stress comprises a second sliding member sliding in response to the second level of counter-thrust, wherein said elastic means comprises a spring mounted at a first end to said slidably mounted valve means, and mounted at a second end to said second sliding member.

21. Pressure controlled apparatus comprising, in combination with a space in a working apparatus, in which more than one level of a regulated pressure is to be maintained, with a source of pressure, with conduit means placing said pressure source in communication with said working apparatus space, and with valve means having an open position in which said space is open to said conduit means and a closed position in which said space is sealed off from said conduit means, said pressure in said space creating a first pressure trust on said valve means urging the same to its closed position, pressure level control means comprising elastic means opposing the closure of said valve means by exerting thereon an elastic counterthrust opposed to said first pressure thrust, said means being normally in a condition of normal stress wherein it creates a first level of elastic counterthrust such as to be overcome by said pressure thrust when said primary pressure exceeds a first predetermined level; and a sliding member moving in response to a second pressure thrust for bringing said elastic means to at least another condition of stress, wherein it creates a second level of elastic counter-thrust such as to be overcome by said first pressure thrust when said primary pressure exceeds a second predetermined level.

22. Pressure controlled apparatus comprising, in combination with a space in a working apparatus, in which more than one level of a regulated pressure is to be maintained, with a source of pressure, with conduit means placing said pressure source in communication with said working apparatus space, and with valve means having an open position in which said space is open to said conduit means, said pressure in said space creating a pressure thrust on said valve means urging the same to its closed position, pressure control means comprising an elastic member mounted to the valve means at a first side and to a moving cylinder at a second side, wherein said elastic member exerts a plurality of counterthrust levels as the valve means and the cylinder are at their open or closed positions.

23. A pressure control apparatus for switching a pressure in a chamber between at least two distinct pressure levels, in combination with a first valve having an open position and a closed position, the first valve being urged to said closed position by a pressure thrust, comprising:

an elastic element engaging said valve at a first end and opposing the closure of said first valve by exerting thereon an elastic counter-thrust, wherein said elastic element has a predetermined condition of normal stress, creating a first level of counter-thrust capable of being overcome by said pressure when it exceeds a first predetermined level; and a second valve engaging said elastic element at a second end and bringing said elastic element to a second condition of stress, wherein the elastic element creates a second level of counter-thrust capable of being overcome by said pressure thrust when it exceeds a second predetermined level.

* * * * *